(12) United States Patent
Yussouff et al.

(10) Patent No.: US 8,472,353 B2
(45) Date of Patent: Jun. 25, 2013

(54) PROVISIONING/CONFIGURATION SYSTEMS FOR BRIDGING VPN FOR IP AUDIO CONFERENCING

(75) Inventors: Ashraf Yussouff, Wesley Chapel, FL (US); Nitin Anant Bhanap, Raleigh, NC (US); Clifton C. Ting, Holmdel, NJ (US); Neerja Juneja Bajaj, Lexington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 250 days.

(21) Appl. No.: 12/987,342

(22) Filed: Jan. 10, 2011

(65) Prior Publication Data

US 2012/0176942 A1 Jul. 12, 2012

(51) Int. Cl.
*H04L 12/16* (2006.01)
*H04Q 11/00* (2006.01)

(52) U.S. Cl.
USPC ........... 370/260; 370/352; 370/353; 370/354; 370/355; 370/356; 370/282; 370/400; 370/401; 370/409; 455/416; 379/202.01

(58) Field of Classification Search
USPC ................. 370/260, 282, 285, 352–356, 400, 370/401, 409; 455/416; 379/202.01
See application file for complete search history.

(56) References Cited

U.S. PATENT DOCUMENTS

| | | | |
|---|---|---|---|
| 7,675,923 B2 * | 3/2010 | Rossi et al. | 370/401 |
| 7,848,335 B1 * | 12/2010 | Kang et al. | 370/401 |
| 2009/0220064 A1 * | 9/2009 | Gorti et al. | 379/202.01 |

* cited by examiner

*Primary Examiner* — Ayaz Sheikh
*Assistant Examiner* — Blanche Wong (57) ABSTRACT

Internet Protocol (IP) audio conferencing bridging provisioning/configuration systems receive a service order request associated with a customer, where the service order request requests enrollment of the customer in a Virtual Private Network (VPN) bridging network service for IP Audio Conferencing. The provisioning/configuration systems orchestrate, based on the service order request, configuration of multiple network nodes in a network that provides the VPN bridging network service for IP Audio Conferencing to the customer to enable IP audio conferencing calls to be made from the customer via the network.

28 Claims, 8 Drawing Sheets

PROVISIONING/CONFIGURATION SYSTEMS FOR BRIDGING VPN FOR IP AUDIO CONFERENCING

BACKGROUND

Conference calls are typically used to enable three or more parties to talk with one another over a same conferencing line. A common technique for establishing a conference call involves the provision of a "dial-in" conference telephone number that is used to join the parties to a common bridge in the Public Switched Telephone Network (PSTN). When each party to the conference call dials in to the provided telephone number, they are connected through a common conferencing bridge that enables them to converse with all other parties connected to the conferencing bridge.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In embodiments described herein, a network implements VPN bridging for IP Audio Conferencing for customers enrolled in an IP audio conferencing network service. When a customer requests enrollment in the IP audio conferencing network service, various systems for provisioning and configuring the network that provide the network service set-up and configure various nodes in the network to provide the IP audio conferencing network service to the customer over a Virtual Private Network and private IP network used by the customer.

Figure 1A:
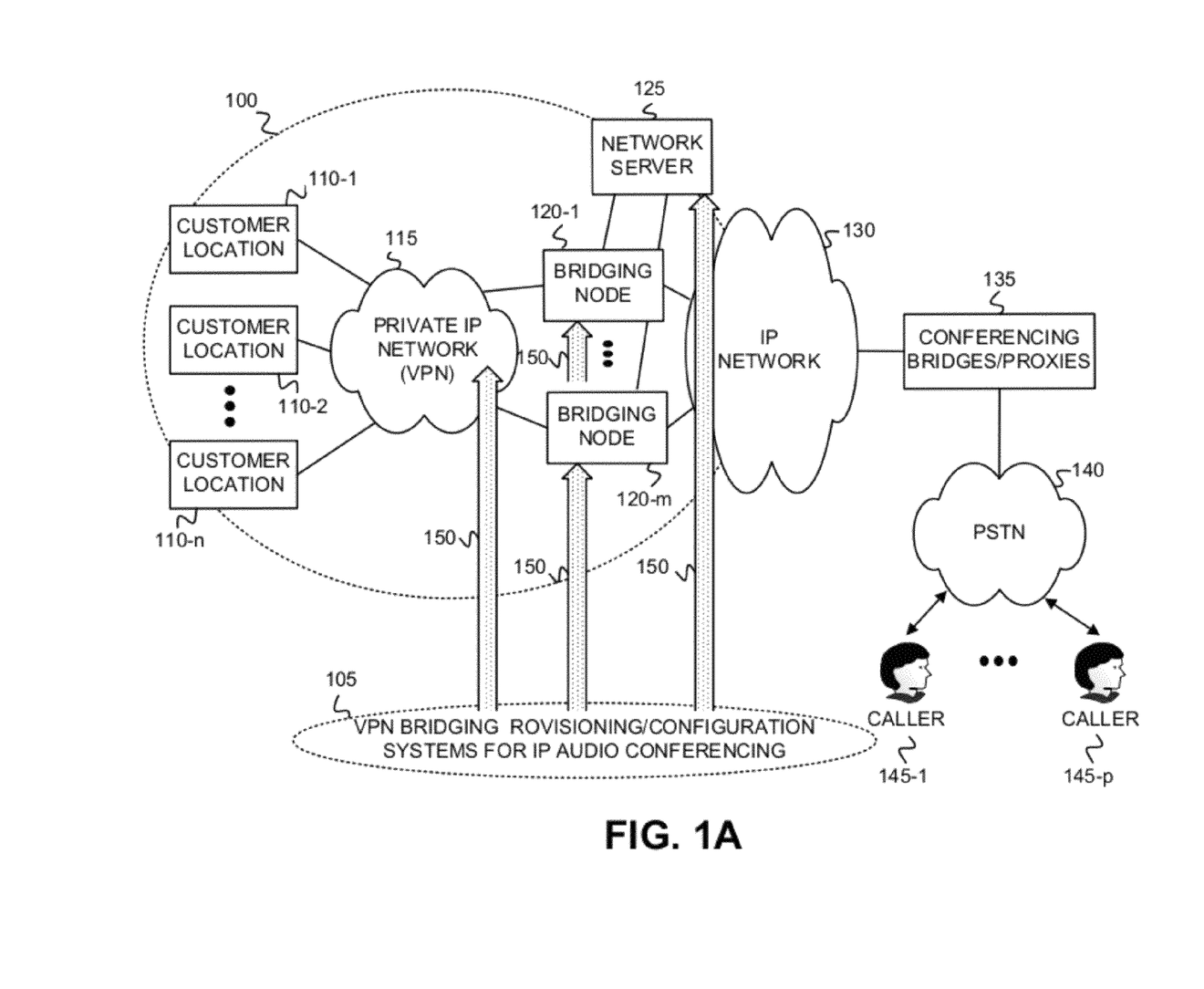
FIG. 1A is a diagram that depicts an exemplary network environment in which a network service may provide Internet Protocol (IP) audio conferencing between at least one caller connected to a private IP network and one or more other callers.

FIG. 1A is a diagram that depicts an exemplary network environment in which a network service may provide Internet Protocol (IP) audio conferencing between at least one caller connected to a private IP network and one or more other callers. As shown in FIG. 1A, a network 100 that provides IP audio conferencing may include multiple customer locations 110-1 through 110-n (referred to generically herein as "customer location 110"), a private network 115, multiple bridging nodes 120-1 through 120-m, and a network server 125. Network 100 may connect to one or more conferencing bridges 135 via an IP network 130. As further shown in FIG. 1A, a Public Switched Telephone Network (PSTN) 140 may connect to conferencing bridges/proxies 135 to permit multiple callers 145-1 through 145-p to engage in audio conferencing via conferencing bridges/proxies 135.

Each customer location may include a Customer Premises Equipment (CPE) (not shown) and a Customer Edge Router ("CE Router") (not shown) that interconnects multiple callers associated with a given customer to private IP network 115. Private IP network 115 may include a network that uses a private IP address space and which is designed for providing IP audio communication between callers of a given customer location 110, between callers of different customer locations 110, or between one or more callers of one or more customer locations 110 and callers 145 connected to PSTN 140. Private IP network 115 may implement multiple different Virtual Local Area Networks (VLANs) for providing IP audio communication between callers.

Bridging nodes 120-1 through 120-m may each receive IP conference calls from customer locations 110-1 through 110-n. Bridging nodes 120-1 through 120-m may determine, in consultation with network server 125, which one of conferencing bridges or their proxies 135 each call should be routed to. For example, bridging nodes 120-1 through 120-m may determine an IP address of the conferencing bridge/proxy 135 to which each call should be routed.

IP network 130 may include any type of network that implements IP. Network 130 may include one or more mobile networks, a local area network (LAN), a wide area network (WAN), a metropolitan area network (MAN), an intranet, the Internet, and/or a cable network (e.g., an optical cable network) that implements IP. In one implementation, IP network 130 may include the conferencing provider's IP backbone network.

Conferencing bridges 135 may include devices that may bridge multiple phone calls from multiple callers together into a single conferencing call, thus enabling the multiple callers to exchange audio data (i.e., converse) with one another. Conferencing bridges 135 may bridge one or more callers of customer locations 110 with one or more callers connected to PSTN 140 for a conferencing call. Additionally, conferencing bridges 135 may bridge multiple callers connected to PSTN 140 for a conferencing call. Furthermore, conferencing bridges 135 may bridge multiple callers of customer locations 110 for a conferencing call.

FIG. 1A further depicts one or more VPN bridging for IP Audio Conferencing provisioning and configuration systems 105 connected to network 100. Systems 105 may orchestrate the provisioning and configuration of network components in network 100 to enable the IP audio conferencing network service to be provided to each customer location 110. Systems 105 are depicted as provisioning/configuring 150 components (not shown) of private IP network 115, components (not shown) of bridging nodes 120-1 through 120-m, and network server 125. The provisioning/configuration of network 100 by systems 105 will be described in further detail below.

Figure 1B:
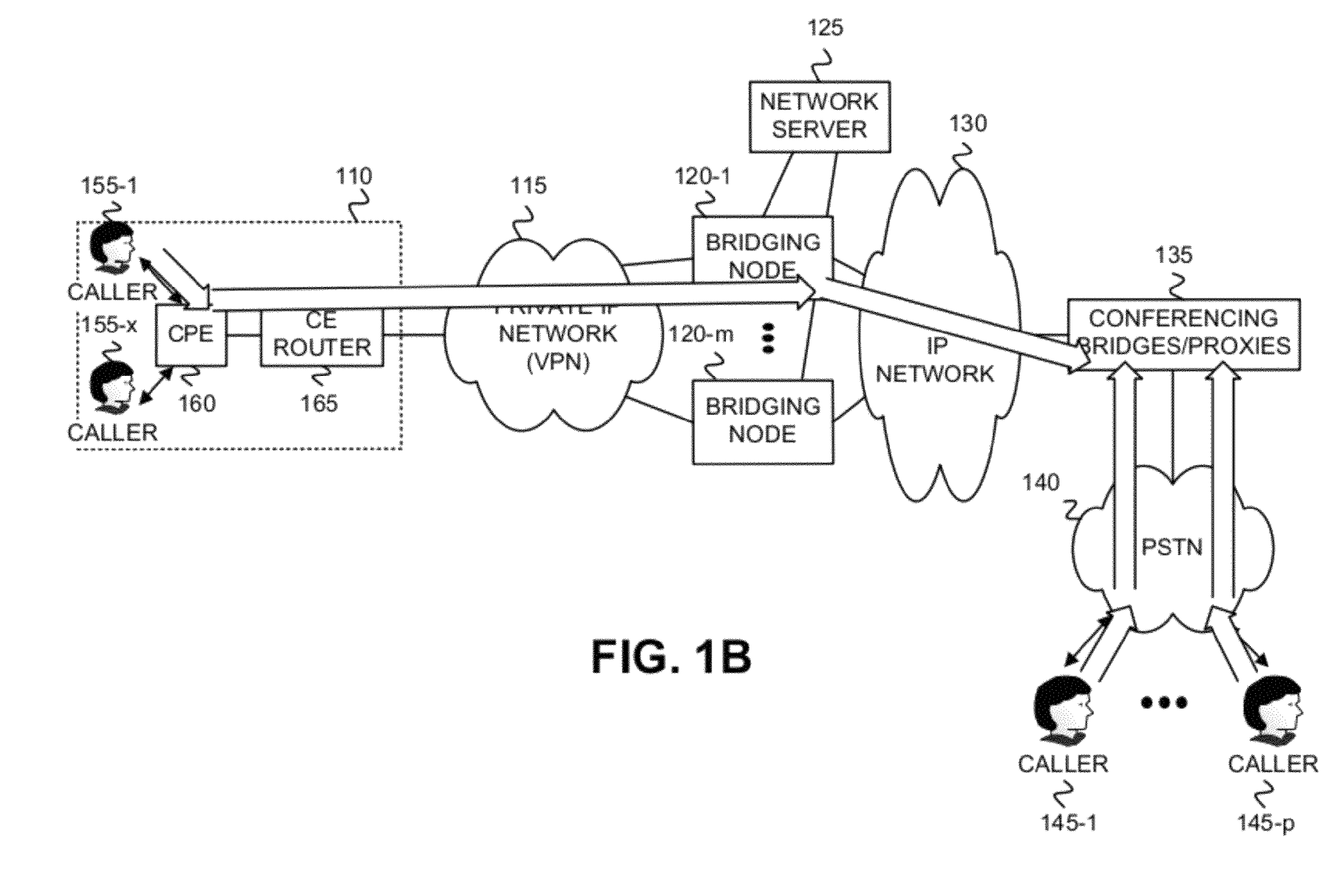
FIG. 1B depicts an example of the implementation of IP audio conferencing involving a caller associated with a customer location of FIG. 1A, and callers connected to a Public Switched Telephone Network.

FIG. 1B depicts an example of the implementation of IP audio conferencing involving callers 155-1 through 155-x associated with a customer location 110, and callers 145-1 and 145-*p* connected to PSTN 140. Callers 145-1 and 145-*p* may dial a previously assigned conferencing number (e.g., an 800 number specifically assigned for a conferencing call) and PSTN 140 may connect the dialed calls through to conference bridge 135 using existing PSTN switching techniques. Caller 155-1 of customer location 110 may dial the previously assigned conferencing number and, upon receipt of the call, a Customer Premises Equipment (CPE) (e.g., a private branch exchange) of customer location 110 may recognize the dialed number as a conferencing call, and may route the call on private IP network 115 towards a bridging node 120 designated for the customer location 110. The bridging node 120 may receive the call (e.g., Session Initiation Protocol (SIP) signaling associated with the call) and may consult with network server 125 to identify the call as a conferencing call by verifying that a valid conferencing number has been dialed, and to identify the conferencing bridge of conferencing bridges 135 to which the call should be routed. Once the conferencing bridge/proxy is identified, bridging node 120 may send the call out on an IP path in IP network 130 to the identified conference bridge.

Figure 2A:
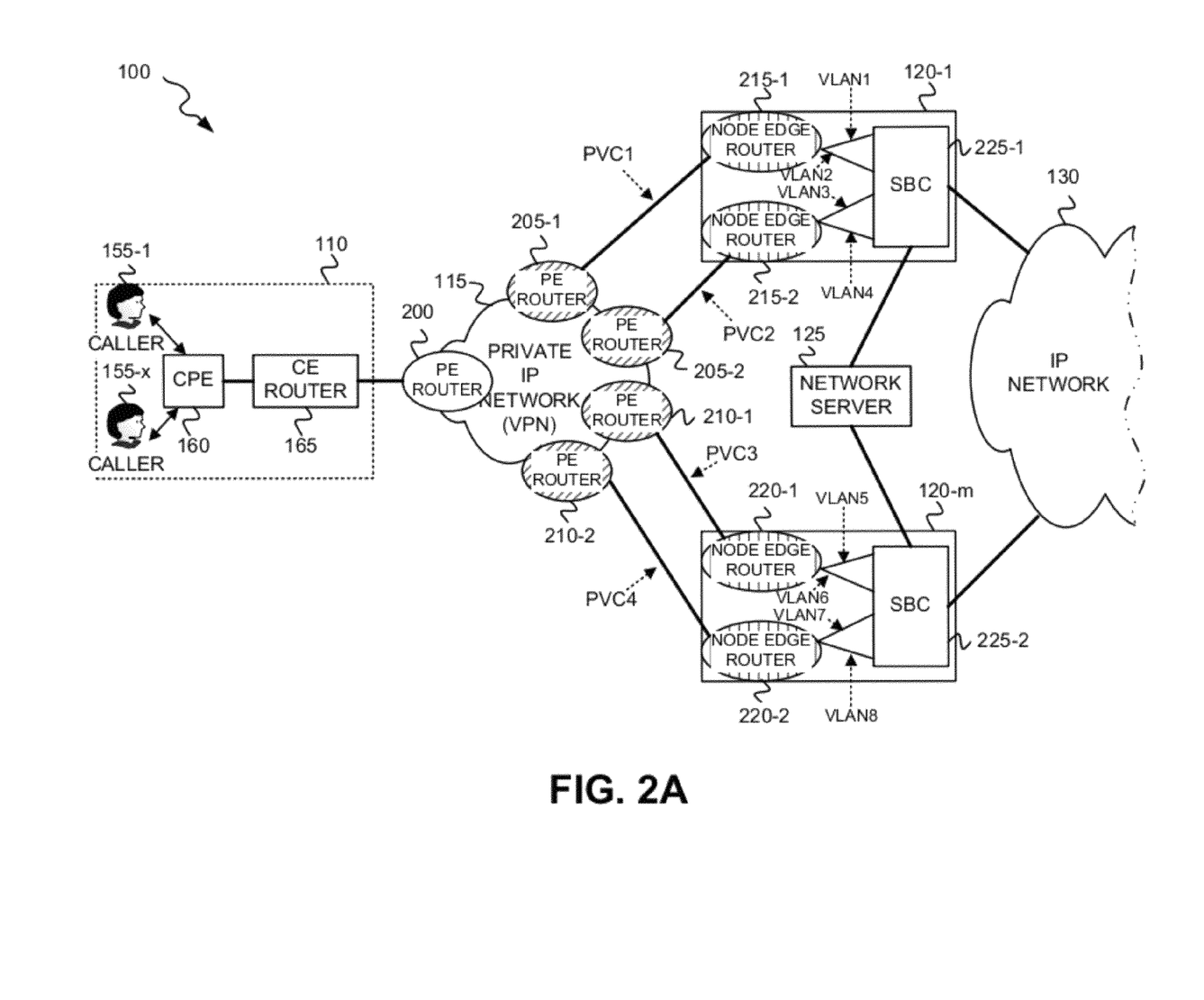
FIG. 2A depicts further details of certain components of the network of FIG. 1A.

FIG. 2A depicts further details of certain components of network 100. FIG. 2A shows that private IP network 115 includes provider edge (PE) routers 200, 205-1, 205-2, 210-1 and 210-2. FIG. 2A further shows bridging node 120-1 as including node edge routers 215-1 and 215-2, and session-border controller (SBC) 225-1. FIG. 2A additionally shows bridging node 120-*m* as including node edge routers 220-1 and 220-2 and SBC 225-2.

PE router 200 may connect to customer location 110 and may be set-up to be included in the customer's VLAN. PE router 200 may route signaling and audio traffic from customer location 110 towards one of bridging nodes 120-1 through 120-*m* (via one of PE routers 205-1, 205-2, 210-1 or 210-2). PE router 200 may also route signaling and audio traffic received from bridging nodes 120-1 through 120-*m* to customer location 110 (via one of PE routers 205-1, 205-2, 210-1 or 210-2). PE routers 205-1, 205-2, 210-1 and 210-2 may each route traffic to/from respective node edge routers 215-1, 215-2, 220-1 and 220-2 via respective Permanent Virtual Circuits (PVCs). Node edge routers 215-1, 215-2, 220-1 and 220-2 may route traffic received via IP network 130 to private IP network 115 via respective PVCs. Node edge routers 215-1 and 215-2 may route traffic received from respective PE routers 205-1 and 205-2 to SBC 225-1 via respective VLANs (e.g., VLAN1, VLAN2, VLAN 3 and VLAN4) to SBC 225-1. Node edge routers 220-1 and 220-2 may route traffic received from respective PE routers 210-1 and 210-2 to SBC 225-2 via respective VLANs (e.g., VLAN6, VLAN7, VLAN 8, and VLAN9) to SBC 225-2.

Node edge router 215-1 may connect to SBC 225-1 via two different VLANs (VLAN 1 and VLAN2) set-up to handle signaling and audio traffic between node edge router 215-1 and SBC 225-1. Node edge router 215-2 may connect to SBC 225-1 via two different VLANs (VLAN3 and VLAN4) set-up to handle signaling and audio traffic between node edge router 215-2 and SBC 225-1. Node edge router 220-1 may connect to SBC 225-2 via two different VLANs (VLAN 5 and VLAN 6) set up to handle signaling and audio traffic between node edge router 220-1 and SBC 225-2. Node edge router 220-2 may connect to SBC 225-2 via two different VLANs (VLAN 7 and VLAN8) set-up to handle signaling and audio traffic between node edge router 220-2 and SBC 225-2. As further shown in FIG. 2A, SBCs 225-1 and 225-2 may each connect to network server 125, and may also each connect to IP network 130. In some implementations, VLANs 1 and 3 may be the same VLAN, VLANs 2 and 4 may be the same VLAN, VLANs 5 and 7 may be the same VLAN, and VLANs 6 and 8 may be the same VLAN.

SBC 225-1 may and SBC 225-2 may receive signaling associated with a call from a customer location 110, and may identify whether the call is a conferencing call. If the call is determined to be a conferencing call, SBC 225-1 and SBC 225-2 may obtain a network address, from network server 125, for one of conferencing bridges 135 to which the conferencing call should be routed. SBC 225-1 and SBC 225-2 may route the call to the conferencing bridge 135 having the obtained network address. Network server 125 may store a lookup table that enables a network address of a conferencing bridge to be retrieved based on a conferencing call number dialed by a call at a customer location 110. In addition to a network address being associated with a conferencing call telephone number, an entry of the lookup table may additionally include a new conferencing telephone number. The new conferencing telephone number may be associated with conferencing calls originating in private IP network 115 (e.g., an IP originated call) and may effectively translate the original dialed conferencing telephone number to a new, designated conferencing telephone number that enables the call to be identified as originating in private IP network 115, and, thus, possibly billed differently.

Figure 2B:
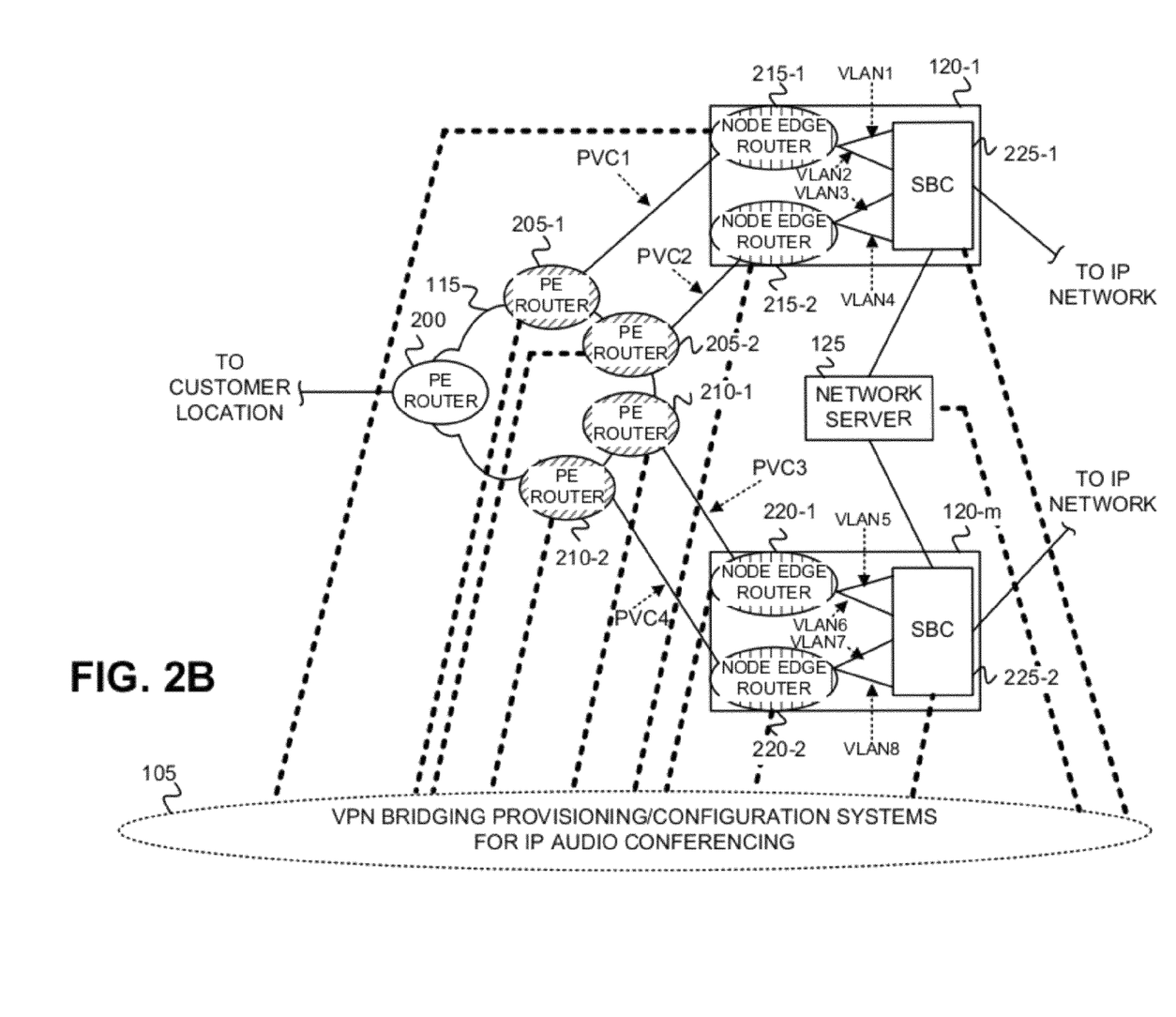
FIG. 2B further depicts VPN bridging provisioning/configuration systems for IP Audio Conferencing, interconnected with components of the network of FIG. 1A to enable the provisioning/configuration systems to appropriately configure these components so as to enable customer locations to engage in IP audio conferencing via the network.

FIG. 2B further depicts VPN bridging provisioning/configuration systems for IP Audio Conferencing 105 interconnected with PE routers 205-1, 205-2, 210-1 and 210-2, node edge routers 215-1, 215-2, 220-1, 220-2, SBCs 225-1 and 225-2, and network server 125 to appropriately configure these various routers, SBCs and the network server so as to enable a customer location to engage an IP audio conferencing via network 100.

As described in further detail below, systems 105 may connect to each of PE routers 205-1, 205-2, 210-1 and 210-2, node edge routers 215-1, 215-2, 220-1, 220-2, SBCs 225-1 and 225-2, and network server 125 to variously configure these network nodes so that callers at customer locations 110 may engage a VPN bridge for IP Audio Conferencing via network 100. Systems 105 may set-up PE routers 205-1, 205-1, 210-1 and/or 210-2 to be part of a customer's VPN when that customer requests VPN bridging for IP Audio Conferencing service. Systems 105 may further set-up PVCs between PE router 205-1 and node edge router 215-1, between PE router 205-2 and node edge router 215-2, between PE router 210-1 and node edge router 220-1, and between PE router 210-2 and node edge router 220-2. Systems 105 may also set-up separate VLANs between node edge router 215-1 and SBC 225-1, between node edge router 215-2 and SBC 225-1, between node edge router 220-1 and SBC 225-2, and between node edge router 220-2 and SBC 225-2. As shown in FIG. 2B, systems 105 may set-up two different VLANs between each node edge router and SBC, with one VLAN intended to carry signaling traffic (e.g., Session Initiation Protocol) signaling traffic, and the other VLAN intended to carry audio traffic.

Figure 3:
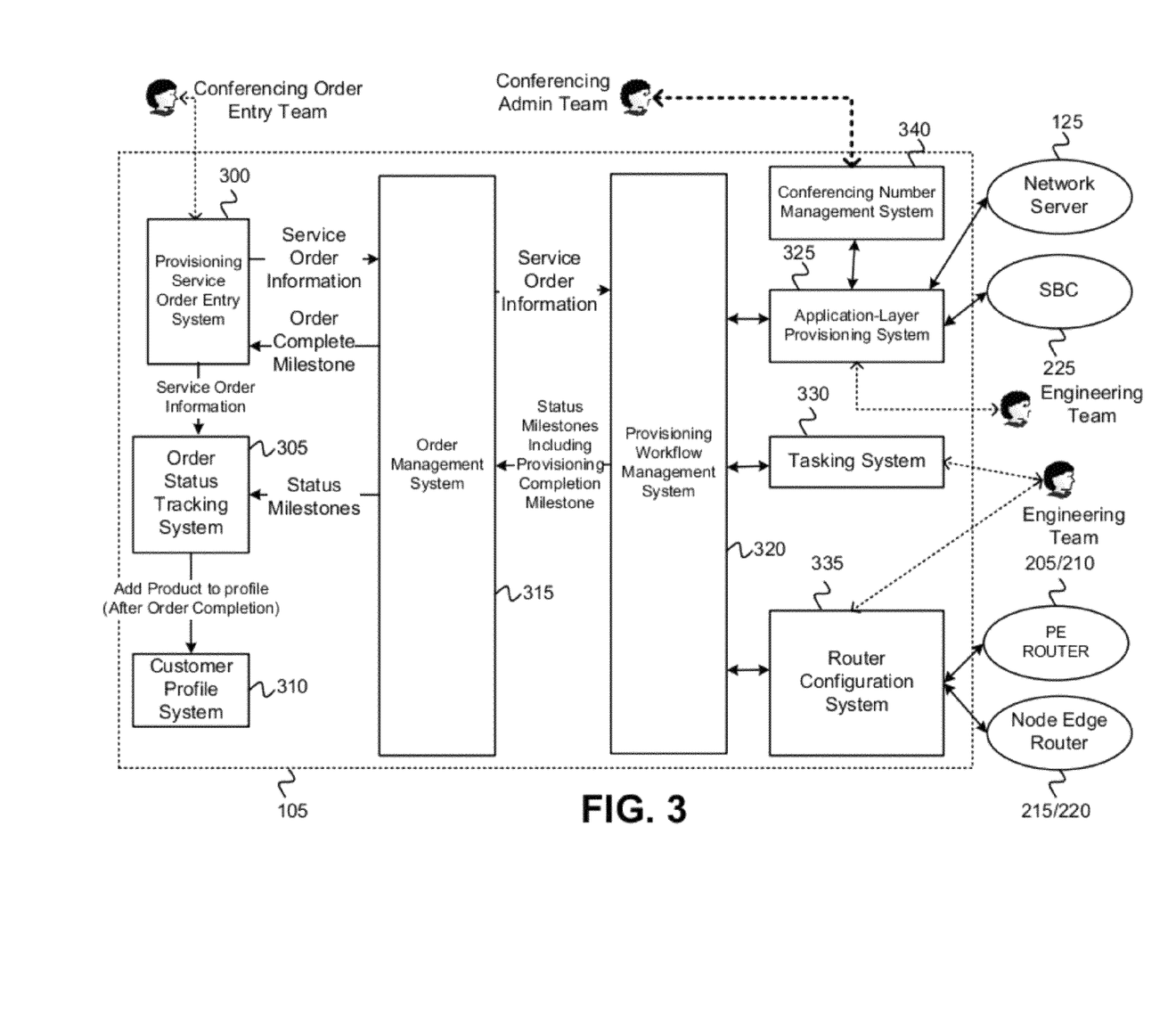
FIG. 3 is a diagram that depicts exemplary system components of the VPN bridging provisioning/configuration systems for IP Audio Conferencing of FIG. 2B.

FIG. 3 is a diagram that depicts exemplary system components of VPN bridging provisioning/configuration systems for IP Audio Conferencing 105. Systems 105 may include a provisioning service order entry system 300, an order status tracking system 305, a customer profile system 310, an order management system 315, a provisioning workflow management system 320, an application-layer provisioning system 325, a tasking system 330, a router configuration system 335, and a conferencing number management system 340.

Provisioning service order entry system 300 may receive new service orders associated with customer's requesting enrollment in the IP audio conferencing network service. The new service orders may include service order information, such as, for example, a name of the customer's private IP network, and VPN. The service order information may further include a conferencing account number associated with the customer and other optional network configuration attributes (e.g., a customer-preferred IP address space, identification of redundant connections for geo-survivability, etc.). The new service orders may be received, for example, from a conferencing order entry team.

Order tracking system 305 may keep a log of status milestones received from order management system, where the status milestones indicate the progress of the provisioning and network configuration associated with a customer's service order request. Order tracking system 305 may, upon receiving a status milestone that indicates that the provisioning/network configuration for a service order request is complete, update customer profile system 310 to store information that the IP audio conferencing network service is now available to the customer over the customer's VPN.

Customer profile system 310 may store the information, received from order tracking system 305, that the IP audio conferencing network service is available to the customer over the customer's VPN. This information may be stored in a customer profile associated with the customer that also stores other information related to the customer and the customer's account. Order management system 315 may receive service order information from provisioning service order entry system 300. Order management system 315 may initiate the provisioning and network configuration associated with a new service order for a customer via instructions and service order information sent to provisioning workflow management system 320.

Provisioning workflow management system 320 may manage the provisioning and network configuration associated with a new service order for a customer. Provisioning workflow management system 320 may initiate the provisioning and network configuration by invoking the operation of application-layer provisioning system 325. Application-layer provisioning system 325 may configure SBCs 225-1 and 225-2, including setting up VLANs between the node edge routers and the SBCs. Application-layer provisioning system 325 may further notify provisioning workflow management system 320 if router configuration will be required for the service order.

Tasking system 300 may store work requests from provisioning workflow management system 320 associated with the router configuration to be performed by router configuration system 335. An engineering team may use the stored work requests to assist in the router configuration performed by router configuration system 335. Router configuration system 335 may configure PE routers 205-1, 205-2, 210-1 and 210-2, and node edge routers 215-1, 215-2, 220-1 and 220-2. Configuration of PE routers 205-1, 205-2, 210-1 and 210-2 may include setting up each PE router to be included in the customer's VPN, and setting up a PVC between each PE router and a corresponding node edge router. Configuration of node edge routers 215-1, 215-2, 220-1 and 220-2 may include setting up the PVC between each node edge router and a corresponding PE router. Configuration of node edge routers 215-1, 215-2, 220-1 and 220-2 may include setting up VLANs for carrying signaling traffic and audio traffic between each node edge router and a corresponding SBC.

Conferencing number management system 340 may keep inventory of, and perform assignment of, published conferencing 800 numbers, corresponding unpublished 800 numbers used during translation by network server 125, the corresponding IP addresses for the call hand-off from the bridging nodes to the conferencing bridges/proxies, and the subscriber-specific conferencing pass-codes for conference call leaders and participants. Conferencing number management system 340 may "push" the assigned conferencing numbers, IP addresses and subscriber-specific conference passcodes for conference call leaders and participates to network server 125.

Figure 4:
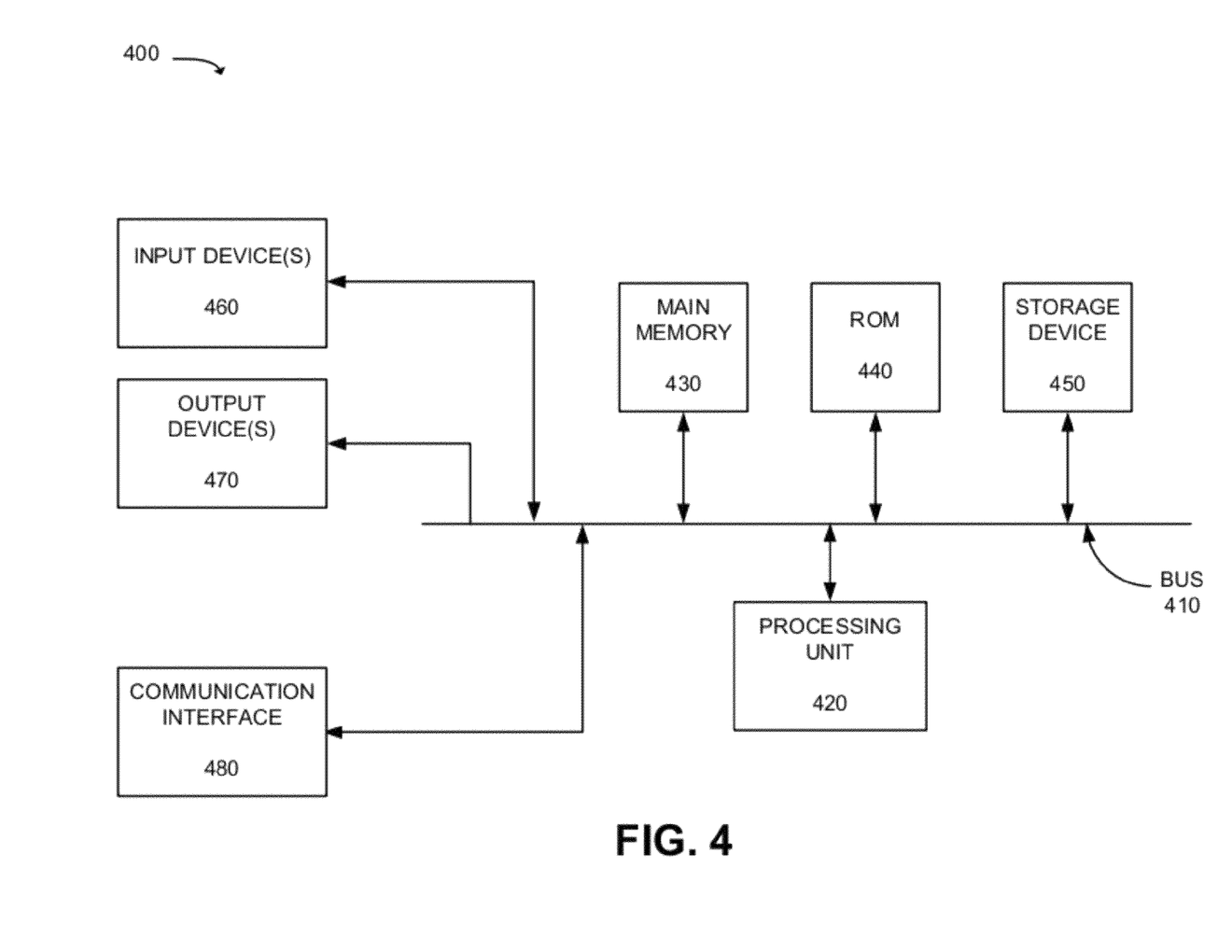
FIG. 4 is a diagram that depicts exemplary components of a system 400, which may correspond to any one of the systems of FIG. 3.

FIG. 4 is a diagram that depicts exemplary components of a system 400, which may correspond to any one of the systems 105. System 400 may correspond to provisioning service order entry system 300, order status tracking system 305, customer profile system 310, order management system 315, provisioning workflow management system 320, application-layer provisioning system 325, tasking system 330, router configuration system 335, or conferencing number management system 340.

System 400 may include a bus 410, a processing unit 420, a main memory 430, a read only memory (ROM) 440, a storage device 450, an input device(s) 460, an output device(s) 470, and a communication interface 480. Bus 410 may include a path that permits communication among the elements of system 400.

Processing unit 420 may include a processor, microprocessor, or processing logic that may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium.

Input device 460 may include one or more mechanisms that permit an operator to input information to management system 205, such as, for example, a keypad or a keyboard, voice recognition and/or biometric mechanisms, etc. Output device 470 may include one or more mechanisms that output information to the operator, including a display, a speaker, etc. Communication interface 480 may include any transceiver mechanism that enables management system 205 to communicate with other devices and/or systems. For example, communication interface 480 may include mechanisms for communicating with via private IP network 115 or IP network 130.

System 400 may perform certain operations or processes, as described herein. System 400 may perform these operations in response to processing unit 420 (or multiple processing units—not shown) executing software instructions contained in a computer-readable medium, such as memory 430. A computer-readable medium may include a physical or logical memory device. A logical memory device may include memory space within a single physical memory device or spread across multiple physical memory devices.

The software instructions may be read into main memory 430 from another computer-readable medium, such as storage device 450, or from another device via communication interface 480. The software instructions contained in main memory 430 may cause processing unit 420 to perform operations or processes that are described below. Alternatively, hardwired circuitry may be used in place of or in combination with software instructions to implement processes described herein. Thus, exemplary implementations are not limited to any specific combination of hardware circuitry and software.

The configuration of components of system 400 illustrated in FIG. 4 is for illustrative purposes only. Other configurations may be implemented. Therefore, system 400 may include additional, fewer and/or different components than those depicted in FIG. 4.

Figure 5A:
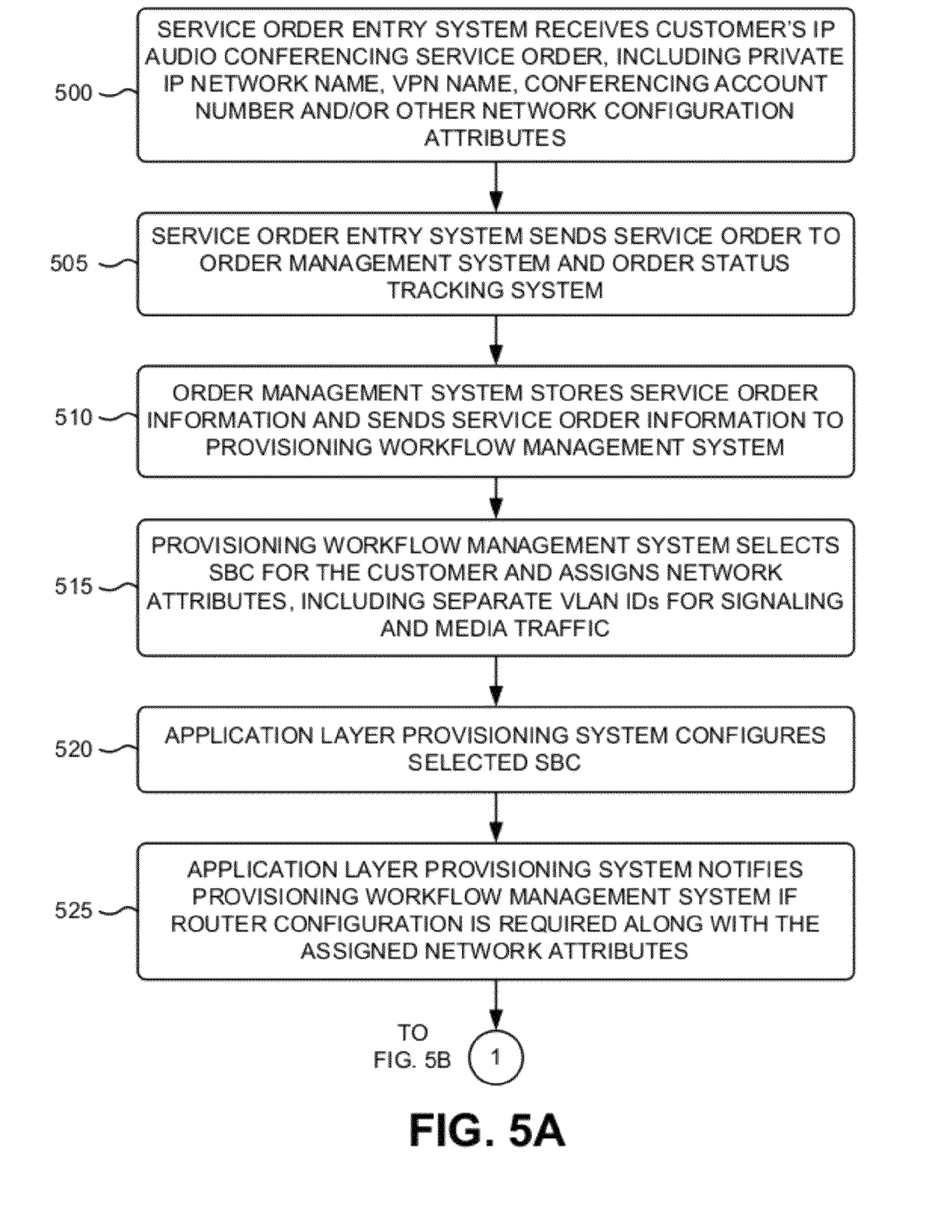
FIGS. 5A and 5B are flow diagrams that illustrate an exemplary process for provisioning/configuring components of a network to enable them to provide VPN bridging network service for IP audio conferencing to requesting customers.
Figure 5B:
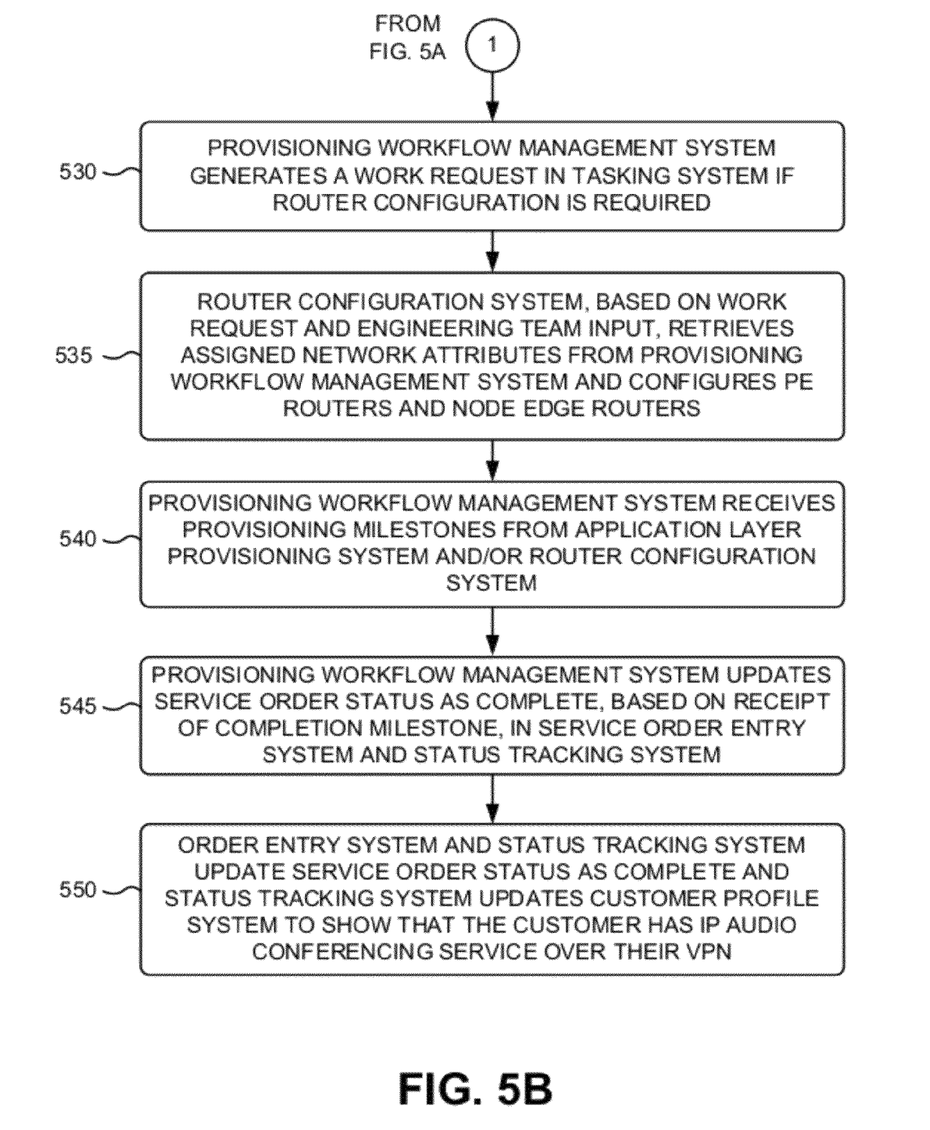

FIGS. 5A and 5B are flow diagrams that illustrate an exemplary process for provisioning/configuring components of a network to enable them to provide a VPN bridging network service for IP Audio Conferencing to requesting customers. The exemplary process of FIGS. 5A and 5B may be implemented by components of VPN bridging provisioning/configuration systems for IP Audio Conferencing 105. The description of the exemplary process of FIGS. 5A and 5B below may refer to the diagram of FIG. 3.

The exemplary process may include service order entry system 300 receiving a customer's IP audio conferencing service order, including the customer's private network name, Virtual Private Network (VPN) name, conferencing account number and/or other network configuration attributes (block 500). System 300 may receive service order information associated with the service order from, for example, a conferencing order entry team. The other network configuration attributes may include, for example, customer-preferred IP address space or identification of redundant connections (e.g., connections for geo-survivability).

Service order entry system 300 may send the service order to order management system 315 and order status tracking system 305 (block 505). Service order entry system 300 may pass the service order information associated with the service order to order management system 315 and order status tracking system 305. Order management system 315 may store the service order information and may send the service order information to provisioning workflow management system 320 (block 510). Provisioning workflow management system 320 may select a SBC for the customer and assign network attributes, including separate VLAN IDs for signaling and media traffic (block 515). For example, provisioning workflow management system 320 may select SBC 225-1 for handling IP audio conferencing calls from a specific customer location 110, and may assign VLAN IDs for VLAN1 and VLAN2 between node edge router 215-1 and SBC 225-1, and may further assign VLAN IDs for VLAN3 and VLAN 4 between node edge router 215-2 and SBC 225-2.

Application layer provisioning system 325 may configure the selected SBC (block 520). Application layer provisioning system 325 may set-up the VLANs on the router-facing side of SBC 225-1 using the assigned VLAN IDs from block 515. For example, application layer provisioning system 325 may set-up VLAN1 for carrying signaling traffic and VLAN2 for carrying audio traffic associated with a conference call. Additionally, application layer provisioning system 325 may set-up VLAN3 for carrying signaling traffic and VLAN4 for carrying audio traffic associated with a conference call.

Application layer provisioning system 325 may notify provisioning workflow management system 320 if router configuration is required along with the assigned network attributes (block 525). Provisioning workflow management system 320 may generate a work request in tasking system 330 if router configuration is required (block 530—FIG. 5B). The work request may be used by an engineering team in providing input to router configuration system 335 to assist with router configuration.

Router configuration system 335, based on the work request and received engineering team input, may retrieve assigned network attributes from provisioning workflow management system 320 and may configure PE routers 205-1, 205-2, 210-1 and 210-2 and node edge routers 215-1, 215-2, 220-1 and 220-2 (block 535). Configuration of PE routers 205-1, 205-2, 210-1 and 210-2 may include setting up each PE router to be included in the customer's VPN, and setting up a PVC between each PE router and a corresponding node edge router. Configuration of node edge routers 215-1, 215-2, 220-1 and 220-2 may include setting up the PVC between each node edge router and a corresponding PE router. Configuration of node edge routers 215-1, 215-2, 220-1 and 220-2 may include setting up VLANs for carrying signaling traffic and audio traffic between each node edge router and a corresponding SBC.

Provisioning workflow management system 320 may receive provisioning milestones from application layer provisioning system 325 and/or router configuration system 335 (block 540). As the configuration of the SBCs and routers progresses, provisioning workflow management system 320 may receive status milestone messages that indicate the current progress of the provisioning/configuration process for the customer. Once the provisioning/configuration of network 100 is complete, provisioning workflow management system 320 may receive a final, completion milestone message.

Provisioning workflow management system 320 may update the service order status as complete, based on receipt of the completion milestone, in service order entry system 300 and status tracking system 305 (block 545). Order entry system 300 and status tracking system 305 may update the service order status as complete, and status tracking system 305 may update customer profile system 310 to show that the customer has IP audio conferencing service over the customer's VPN (block 550).

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5A and 5B, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A computer-implemented method, comprising:
receiving a service order request associated with a customer, wherein the service order request requests enrollment of the customer in a Virtual Private Network (VPN) bridging network service for Internet Protocol (IP) audio conferencing, wherein the service order request includes a name of a Private IP network (PIP) associated with the customer and a name of a VPN associated with the customer; and orchestrating, based on the service order request, configuration of multiple network nodes in a first network that provides the VPN bridging network service for the IP audio conferencing to the customer to enable IP audio conferencing calls to be made from the customer via the first network.

2. The computer-implemented method of claim 1, wherein orchestrating the configuration of the multiple network nodes comprises:

configuring one or more routers of the first network to be part of the VPN associated with the customer.

3. The computer-implemented method of claim 1, wherein orchestrating the configuration of the multiple network nodes comprises:

configuring two routers to set up a Permanent Virtual Circuit (PVC) between the two routers in the first network.

4. The computer-implemented method of claim 1, wherein orchestrating the configuration of the multiple network nodes comprises:

configuring a router to set up at least one Virtual Local Area Network (VLAN) between the router and a controller device that routes IP audio conferencing calls to one or more conferencing bridges coupled between an IP network and a Public Switched Telephone Network (PSTN).

5. The computer-implemented method of claim 4, wherein orchestrating the configuration of the multiple network nodes comprises:

configuring the controller device to set up the at least one VLAN.

6. The computer-implemented method of claim 5, wherein the at least one VLAN comprises a first VLAN that carries call signaling traffic and a second VLAN that carries call audio traffic.

7. The computer-implemented method of claim 1, wherein the first network comprises a Private IP network having a provider edge (PE) router, and a bridging node, wherein the bridging node comprises an edge router and a session-border controller.

8. The computer-implemented method of claim 7, wherein orchestrating the configuration of the multiple network nodes comprises:

configuring the PE router to be part of a Virtual Private Network (VPN) of the customer;

configuring the PE router and the edge router to set up a Permanent Virtual Circuit (PVC) between the PE router and the edge router;

configuring the edge router to set up at least one Virtual Local Area Network (VLAN) between the edge router and the session-border controller.

9. The computer-implemented method of claim 8, wherein the at least one VLAN comprises a first VLAN that carries call signaling traffic and a second VLAN that carries call audio traffic.

10. A router configuration system, comprising:

a communication interface configured to receive a work request associated with a service order request of a customer, wherein the service order request requests enrollment of the customer in a Virtual Private Network (VPN) bridging network service for Internet Protocol (IP) audio conferencing; and a processing unit, coupled to the communication interface, configured to:

retrieve network attributes associated with a private IP network used by the customer, wherein the private IP network includes a provider edge (PE) router, and a bridging node connected to the private IP network via the PE router, wherein the bridging node comprises an edge router and a session-border controller, and configure multiple routers involved in providing the VPN bridging network service for IP audio conferencing via the private IP network based on the network attributes and the work request.

11. The router configuration system of claim 10, wherein, when configuring the multiple routers, the processing unit is further configured to:

configure two of the multiple routers to set up a Permanent Virtual Circuit (PVC) between the two of the multiple routers.

12. The router configuration system of claim 10, wherein, when configuring the multiple routers, the processing unit is further configured to:

configure a router to set up at least one Virtual Local Area Network (VLAN) between the router and a controller device that routes conferencing calls to one or more conferencing bridges coupled between an IP network and a Public Switched Telephone Network (PSTN).

13. The router configuration system of claim 12, wherein the at least one VLAN comprises a first VLAN that carries call signaling traffic and a second VLAN that carries call audio traffic.

14. The router configuration system of claim 10, wherein, when configuring the multiple routers, the processing unit is further configured to:

configure the PE router to be part of a VPN of the customer;

configuring the PE router and the edge router to set up a Permanent Virtual Circuit (PVC) between the PE router and the edge router;

configuring the edge router to set up at least one Virtual Local Area Network (VLAN) between the edge router and the session-border controller.

15. The router configuration system of claim 10, wherein, when configuring the multiple routers, the processing unit is further configured to:

configure at least one of the multiple routers to be part of a VPN of the customer.

16. A tangible, non-transitory computer-readable medium containing instructions executable by at least one processing unit, the tangible, non-transitory computer-readable medium comprising:

one or more instructions for receiving a work request associated with a service order request of a customer, wherein the service order request requests enrollment of the customer in a Virtual Private Network (VPN) bridging network service for IP Audio Conferencing;

one or more instructions for retrieving network attributes associated with a private IP network used by the customer, wherein the private IP network includes a provider edge (PE) router, and a bridging node is connected to the private IP network via the PE router, wherein the bridging node comprises an edge router and a session-border controller;

one or more instructions for configuring multiple routers involved in providing the VPN bridging network service for IP Audio Conferencing via the private IP network based on the network attributes and the work request, wherein the one or more instructions for configuring multiple routers involved in providing one or more instructions for configuring the PE router to be part of a VPN of the customer;

one or more instructions for configuring the PE router and the edge router to set up a Permanent Virtual Circuit (PVC) between the PE router and the edge router; and one or more instructions for configuring the edge router to set up at least one Virtual Local Area Network (VLAN) between the edge router and the session-border controller.

17. A computer-implemented method, comprising:

receiving a service order request associated with a customer, wherein the service order request requests enrollment of the customer in a Virtual Private Network (VPN) bridging network service for Internet Protocol (IP) audio conferencing; and orchestrating, based on the service order request, configuration of multiple network nodes in a first network that provides the VPN bridging network service for the IP audio conferencing to the customer to enable IP audio conferencing calls to be made from the customer via the first network, wherein orchestrating the configuration of the multiple network nodes comprises:

configuring two routers to set up a Permanent Virtual Circuit (PVC) between the two routers in the first network.

18. A computer-implemented method, comprising:

receiving a service order request associated with a customer, wherein the service order request requests enrollment of the customer in a Virtual Private Network (VPN) bridging network service for Internet Protocol (IP) audio conferencing; and orchestrating, based on the service order request, configuration of multiple network nodes in a first network that provides the VPN bridging network service for the IP audio conferencing to the customer to enable IP audio conferencing calls to be made from the customer via the first network, wherein orchestrating the configuration of the multiple network nodes comprises:

configuring a router to set up at least one Virtual Local Area Network (VLAN) between the router and a controller device that routes IP audio conferencing calls to one or more conferencing bridges coupled between an IP network and a Public Switched Telephone Network (PSTN).

19. The computer-implemented method of claim 18, wherein orchestrating the configuration of the multiple network nodes comprises:

configuring the controller device to set up the at least one VLAN with the router.

20. The computer-implemented method of claim 19, wherein the at least one VLAN comprises a first VLAN that carries call signaling traffic and a second VLAN that carries call audio traffic.

21. A computer-implemented method, comprising:

receiving a service order request associated with a customer, wherein the service order request requests enrollment of the customer in a Virtual Private Network (VPN) bridging network service for Internet Protocol (IP) audio conferencing; and orchestrating, based on the service order request, configuration of multiple network nodes in a first network that provides the VPN bridging network service for the IP audio conferencing to the customer to enable IP audio conferencing calls to be made from the customer via the first network, wherein the first network comprises a Private IP network having a provider edge (PE) router, and a bridging node, wherein the bridging node comprises an edge router and a session-border controller.

22. The computer-implemented method of claim 21, wherein orchestrating the configuration of the multiple network nodes comprises:

configuring the PE router to be part of a VPN of the customer;

configuring the PE router and the edge router to set up a Permanent Virtual Circuit (PVC) between the PE router and the edge router;

configuring the edge router to set up at least one Virtual Local Area Network (VLAN) between the edge router and the session-border controller.

23. The computer-implemented method of claim 22, wherein the at least one VLAN comprises a first VLAN that carries call signaling traffic and a second VLAN that carries call audio traffic.

24. A router configuration system, comprising:

a communication interface configured to receive a work request associated with a service order request of a customer, wherein the service order request requests enrollment of the customer in a Virtual Private Network (VPN) bridging network service for Internet Protocol (IP) audio conferencing; and a processing unit, coupled to the communication interface, configured to:

retrieve network attributes associated with a private IP network used by the customer, and configure multiple routers involved in providing the VPN bridging network service for IP audio conferencing via the private IP network based on the network attributes and the work request, wherein, when configuring the multiple routers, the processing unit is further configured to:

configure two of the multiple routers to set up a Permanent Virtual Circuit (PVC) between the two of the multiple routers.

25. A router configuration system, comprising:

a communication interface configured to receive a work request associated with a service order request of a customer, wherein the service order request requests enrollment of the customer in a Virtual Private Network (VPN) bridging network service for Internet Protocol (IP) audio conferencing; and a processing unit, coupled to the communication interface, configured to:

retrieve network attributes associated with a private IP network used by the customer, and configure multiple routers involved in providing the VPN bridging network service for IP audio conferencing via the private IP network based on the network attributes and the work request, wherein, when configuring the multiple routers, the processing unit is further configured to:

configure a router to set up at least one Virtual Local Area Network (VLAN) between the router and a controller device that routes conferencing calls to one or more conferencing bridges coupled between an IP network and a Public Switched Telephone Network (PSTN).

26. The router configuration system of claim 25, wherein the at least one VLAN comprises a first VLAN that carries call signaling traffic and a second VLAN that carries call audio traffic.

27. A router configuration system, comprising:
a communication interface configured to receive a work request associated with a service order request of a customer, wherein the service order request requests enrollment of the customer in a Virtual Private Network (VPN) bridging network service for Internet Protocol (IP) audio conferencing; and
a processing unit, coupled to the communication interface, configured to:
   retrieve network attributes associated with a private IP network used by the customer, and
   configure multiple routers involved in providing the VPN bridging network service for IP audio conferencing via the private IP network based on the network attributes and the work request,
   wherein, when configuring the multiple routers, the processing unit is further configured to:
      configure the PE router to be part of a VPN of the customer;
      configuring the PE router and the edge router to set up a Permanent Virtual Circuit (PVC) between the PE router and the edge router; and
      configuring the edge router to set up at least one Virtual Local Area Network (VLAN) between the edge router and the session-border controller.

28. A router configuration system, comprising:
a communication interface configured to receive a work request associated with a service order request of a customer, wherein the service order request requests enrollment of the customer in a Virtual Private Network (VPN) bridging network service for Internet Protocol (IP) audio conferencing; and
a processing unit, coupled to the communication interface, configured to:
   retrieve network attributes associated with a private IP network used by the customer, and
   configure multiple routers involved in providing the VPN bridging network service for IP audio conferencing via the private IP network based on the network attributes and the work request,
   wherein, when configuring the multiple routers, the processing unit is further configured to:
      configure at least one of the multiple routers to be part of a VPN of the customer.

* * * * *